July 6, 1965

L. P. KUMPF ETAL 3,193,121

CONVEYING APPARATUS

Filed March 29, 1963

July 6, 1965 L. P. KUMPF ETAL 3,193,121
CONVEYING APPARATUS
Filed March 29, 1963 5 Sheets-Sheet 5
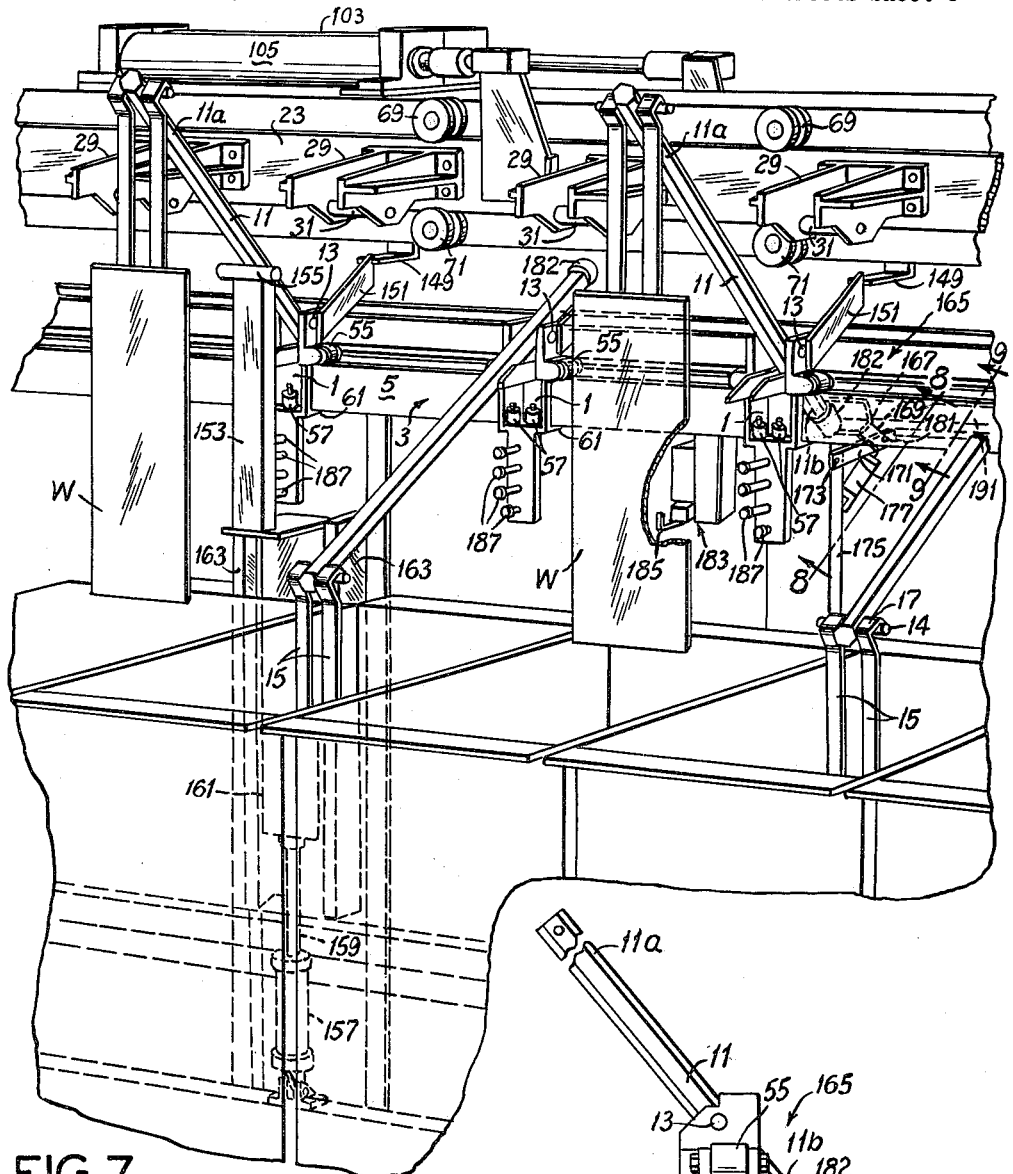
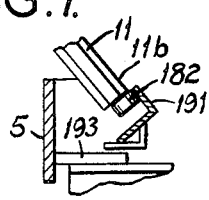
FIG.7.
FIG.9.
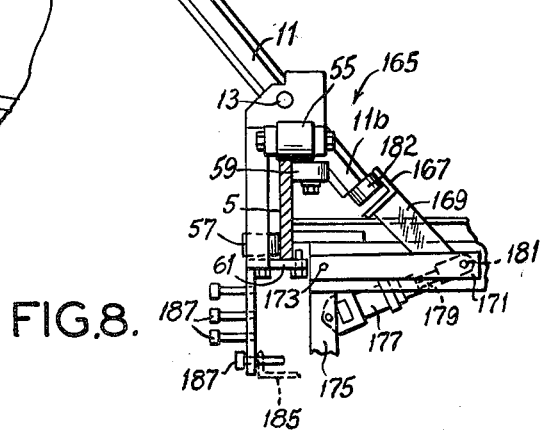
FIG.8.

United States Patent Office 3,193,121
Patented July 6, 1965

3,193,121
CONVEYING APPARATUS
Leonard P. Kumpf, Affton, and Arthur G. Bignall, Kirkwood, Mo., assignors to Lasalco Incorporated, St. Louis, Mo., a corporation of Missouri
Filed Mar. 29, 1963, Ser. No. 269,111
24 Claims. (Cl. 214—89)

This invention relates to conveying apparatus, and more particularly to apparatus for conveying workpieces through a series of liquid treating steps in carrying out plating operations, such as electroplating operations, or the like.

It will be understood that in certain types of processing operations, such as electroplating operations, workpieces are successively dipped in liquid baths in a succession of tanks.

This invention is particularly concerned with a conveying apparatus for conveying a succession of workpieces from tank to tank, the operation involving dipping of each workpiece into a tank, lifting it out of a tank, then conveying it into position for being dipped into the next tank, then dipping it into the next tank, and so on. In this regard, the conveying apparatus comprises a succession of carriages which are intermittently moved along a predetermined path, more particularly an endless path, each carriage carrying means for lowering a workpiece carrier into a tank and lifting it out of the tank. Among the several objects of this invention may be noted the provision of an improved conveying apparatus of this class in which the carriages are individually slidable along a rail without any interconnection, such as a chain, between the carriages, thereby avoiding complications such as would arise from variation in length of the chain; the provision of improved conveying apparatus such as described in which lifting and lowering of the workpiece carriers is essentially vertical, and occurs during dwell intervals of the carriages, as distinguished from lifting and lowering of workpiece carriers during movement of the carriages, which would result in movement of the workpiece carriers on an incline and which complicates the problem of insuring clearance of the tops of the tanks by the workpieces; the provision of improved apparatus such as described in which the carriages are movable in an endless path along a rail structure which comprises two parallel straight rail sections and semicircular end sections interconnecting the straight rail sections; the provision of apparatus such as described having means for holding the carriages against movement during the stated dwell intervals to preclude inadvertent displacement of a carriage or carriages along the rails during the stated dwell intervals, thereby avoiding the possibility of carriages becoming improperly spaced along the rail structure; the provision of apparatus such as described having means to lift the workpieces out of selected tanks at predetermined intervals thereby permitting workpieces to be removed from a selected tank before the end of a cycle of operation; and the provision of improved apparatus such as described having means to retain the workpieces in elevated position out of a selected tank or tanks for one or more cycles of operation, thereby permitting workpieces to be omitted from selected tanks. Other objects and features will be in part apparent and in part pointed out hereinafter.

The invention accordingly comprises the construction hereinafter described, the scope of the invention being indicated in the following claims.

In the accompanying drawings, in which one of various possible embodiments of the invention is illustrated, FIG. 1 is a view side elevation of conveying apparatus constructed in accordance with the present invention, certain tanks for containing treating baths being omitted;

FIG. 3 is an enlarged fragmentary plan viewed generally on line 3—3 of FIG. 1;

FIG. 7 is an enlarged fragmentary detailed perspective of a modification of the conveying apparatus and showing means to raise and retain workpieces in raised position at selected tanks or treating stations;

FIG. 8 is a section taken on line 8—8 of FIG. 7 and showing adjustable means to maintain the workpieces raised at a selected tank or station; and FIG. 9 is a section taken on line 9—9 of FIG. 7 and showing means to maintain the workpieces elevated at a plurality of tanks or stations.

Corresponding reference characters indicate corresponding parts throughout the several views of the drawings.

Figure 1:
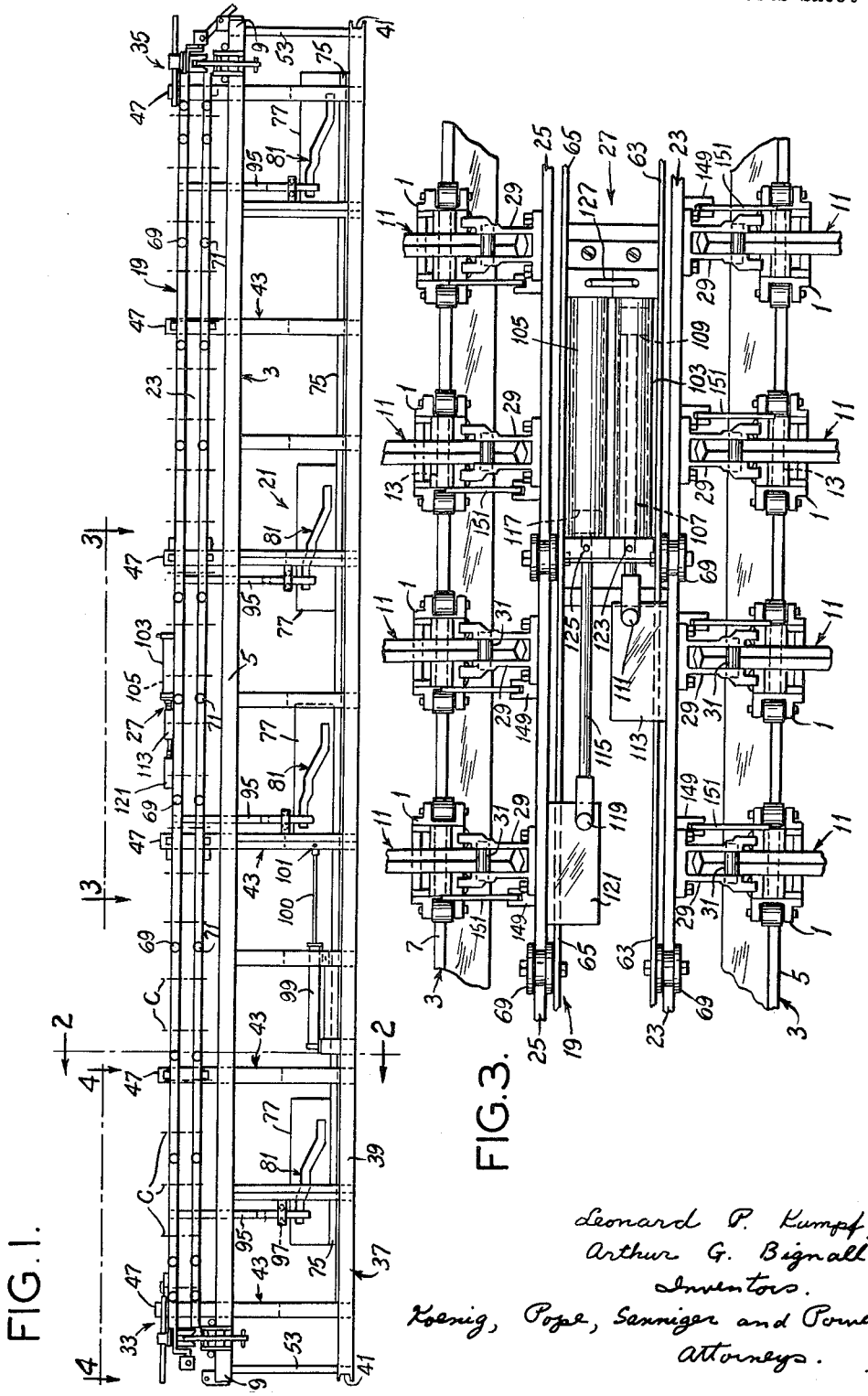

Referring to the drawings, a conveying apparatus constructed in accordance with this invention is shown to comprise a plurality of carriages 1 adapted for travel on an elevated track generally designated 3. This track comprises two parallel straight rail sections 5 and 7, which are of considerable length, and two semicircular end rail sections, each designated 9. One end rail section connects the straight rail sections 5 and 7 at one end thereof and other end rail section connects the straight rail sections at the other end thereof, thereby providing an endless or closed-looped track arrangement.

Track 3 occupies an elevated position above an array of tanks, this array being shown as including a series of tanks T1 located laterally outward of straight rail section 5 on one side of the apparatus, a series of tanks T2 located laterally outward of straight rail section 7 on the other side of the apparatus, and semicircular tanks at the ends of the apparatus. One of the semicircular end tanks appears in FIG. 4, and is designated T3. It will be understood that there may be a similar semicircular tank at the other end of the apparatus. The tanks are omitted in FIG. 1.

Carriages 1 are spaced at equal intervals along the track 3. For convenience, carriages 1 are shown in FIG. 1 only on the semicircular end rail sections. It will be understood that carriages are provided all along the track at intervals indicated by the dash lines C in FIG. 1. As appears in FIG. 4, the spacing of the carriages corresponds to the width of tanks T1 and T2. The carriages are adapted intermittently to be moved in unison along track 3 a distance corresponding to the spacing of the carriages, which is always maintained despite the fact that the carriages are not directly interconnected by a chain or the like. The arrows in FIG. 4 indicate the direction of movement of the carriages on the track. Thus, as shown therein, the carriages travel clockwise around the closed-loop track.

Each carriage 1 has a lifter constituted by an arm 11 pivoted thereon for swinging movement on a horizontal axis as indicated at 13 with this axis extending parallel to the track. The pivot is intermediate the ends of the arm, so that the arm has a portion 11a extending laterally outward from the track, and a portion 11b extending laterally inward from the track. Outer portions 11a of the arms extend over the tanks. Each arm has a pin 14 at its outer end for hanging a workpiece carrier 15 thereon. As shown, carrier 15 consists of a rack having a hook 17 at its upper end for hanging it on a pin 14, and has suitable means thereon for holding a workpiece W (or a plurality of workpieces). Other types of workpiece carriers may be used; it is contemplated, for example, that rotatable barrel-type workpiece carriers may be used on the arms.

Figure 2:
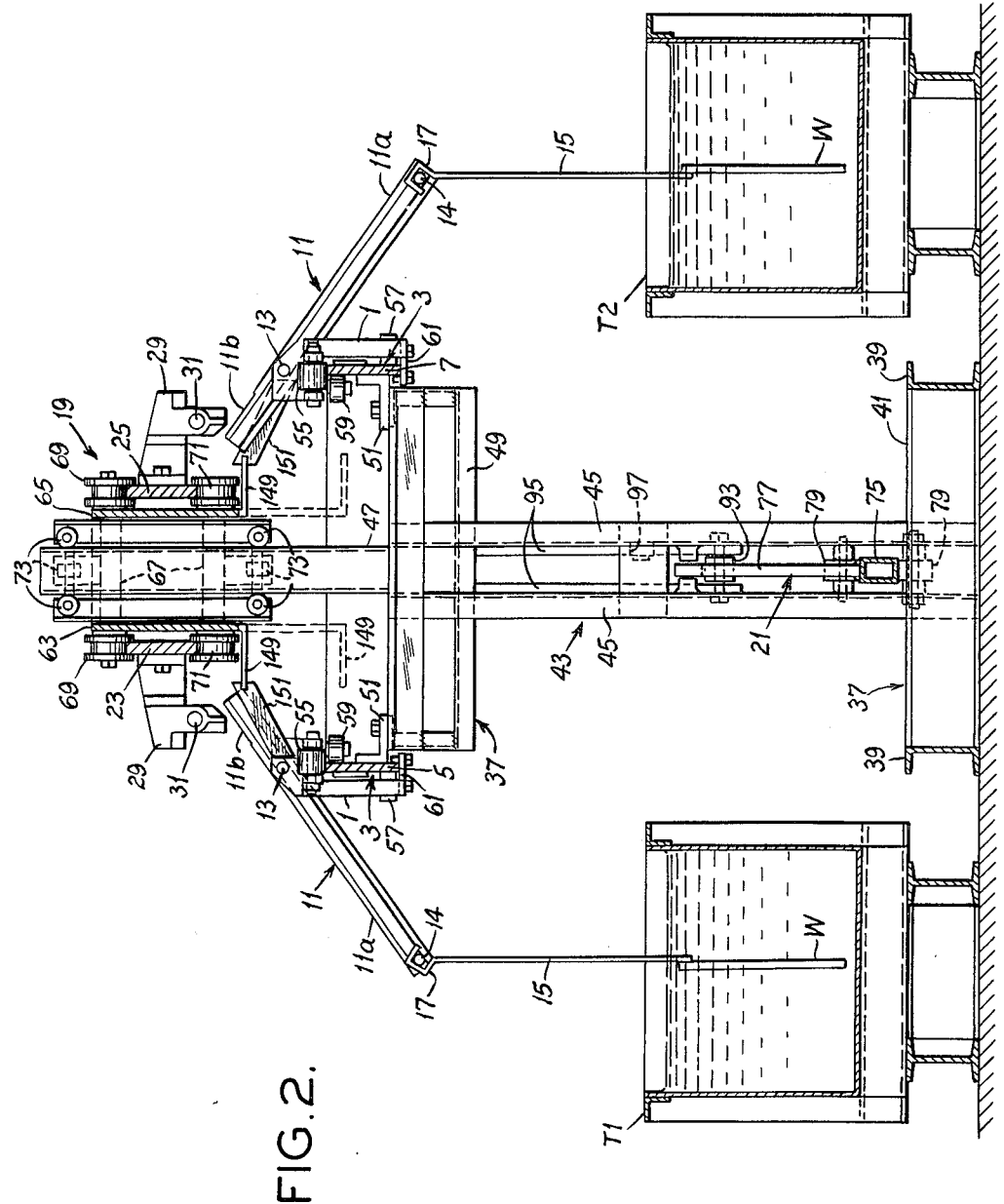
FIG. 2 is an enlarged section taken on line 2—2 of FIG. 1 and showing workpieces in liquid treating tanks on each side of the apparatus of FIG. 1.

FIG. 2 shows two arms 11 on opposite sides of the apparatus in what may be termed their lowered position. In this lowered position on the arms, the workpiece W on the carrier 15 hung on each arm is immersed in the liquid treating bath in a respective tank T1 or T2. It will be apparent that by swinging the arms upward, the workpieces will be lifted out of the tanks, and then, by moving the carriages 1 one step forward (i.e., moving the carriages forward a distance equal to the carriage spacing), the arms and workpieces may be brought into a position over the next successive tanks in the series of tanks. Then, arms 11 may be allowed to swing down to dip the workpieces in the baths in the latter tanks.

At 19 is generally indicated an elevator which is adapted for up and down vertical movement between the straight side rail sections 5 and 7 of track 3. This elevator extends generally from one end of the apparatus to the other between rail sections 5 and 7. Means indicated generally at 21 is provided for vertically raising and lowering this elevator. FIG. 2 shows the elevator in its fully raised position. The elevator carries elongate horizontal slide bars 23 and 25 at opposite sides thereof. These move up and down with the elevator, and are also adapted for horizontal longitudinal sliding movement relative to the elevator. Bars 23 and 25 extend generally the full length of the elevator. Means indicated generally at 27 in FIG. 3 is provided on the elevator for effecting longitudinal sliding movement of bars 23 and 25 relative to the elevator. This means is adapted to slide the bars 23 and 25 back and forth in opposite directions a distance corresponding to the spacing of the carriages 1. That is, during one phase of the cycle of operation of the apparatus, bar 23 moves toward the left and bar 25 moves toward the right as viewed in FIG. 4 a distance corresponding to the carriage spacing, and during another phase of the cycle of operation, bar 23 moves back toward the right and bar 25 moves back toward the left. Movement of bar 23 toward the left and movement of bar 25 toward the right may be referred to as forward movement of these bars, since in such movement the carriages are advanced. Movement of bar 23 toward the right and movement of bar 25 toward the left may be referred to as return movement of these bars, and the FIG. 4 position of the bars may be regarded as their retracted position. The carriages do not move during the stated return movement of the bars.

Each of the slide bars 23 and 25 carries a series of couplers in the form of yokes 29. These are spaced along the bars at intervals corresponding to the carriage spacing. Each coupler or yoke 29 has a crosspin 31. When the elevator is lowered from its FIG. 2 raised position, the yokes 29 come down and straddle the inner ends of the arms 11, and pins 31 on the yokes engage the inner ends of arms 11 from above and swing the outer portions of arms 11 upward, thereby lifting the workpieces out of the tanks. With the yokes straddling the arms 11, the slide bars 23 and 25 are coupled to the carriages. Bars 23 and 25 are then moved forward to advance the carriages one step, thereby advancing each workpiece over the next successive station or tank in the series of tanks. Then the elevator is raised, whereupon the outer end portions of arms 11 swing down for dipping the workpieces. Yokes 29 disengage from the arms (see FIG. 2), and then bars 23 and 25 return to their retracted FIG. 4 position, completing the cycle and positioning the parts for the start of the next cycle. Means indicated generally at 33 is provided for moving the carriages around the semicircular left end rail section and similar means indicated generally at 35 is provided for moving the carriages around the seimcircular right end rail section.

It is to be understood that pins 31 may be omitted from yokes 29 to eliminate lifting of arms 11 at tanks having a plurality of stations while providing for advance of the carriages due to the coupling of yokes 29 and the carriages when the yokes are lowered.

More particularly, the apparatus comprises a main frame generally designated 37. This frame comprises a base constituted by a pair of elongate channels 39 extending generally the full length of the apparatus, held in spaced parallel relation by transverse members 41. Extending up from the base at intervals along its length are posts generally designated 43. Each post has a lower portion comprising a pair of spaced channels 45 and an upper portion 47 of box cross-section. Crossbeams 49 at the upper ends of the lower portions of the posts support the straight rail sections 5 and 7. Each of the latter consists of an elongate flat bar mounted vertically in respect to the crossbeam by means of angle brackets such as indicated at 51. The semi-circular end rail sections are curved bars in continuation of the straight rail sections. Supports such as indicated at 53 (FIG. 5) may be provided for the semi-circular end rail sections. Each carriage has top rollers such as indicated at 55 (FIG. 2) which roll on top of the track 3, outside rollers 57 which engage the outside of the track, inside rollers 59 which engage the inside of the track, and bottom slide members 61.

Elevator 19 comprises a pair of elongate side plates 63 and 65 held in spaced parallel relation by transverse members 67. These plates extend generally the full length of the apparatus. Bar 23 is mounted for horizontal sliding movement on the outside of plate 63 by means of upper and lower grooved rollers 69 and 71. Bar 25 is mounted for horizontal sliding movement on the outside of plate 65 by means of similar rollers 69 and 71. The elevator is guided for vertical up and down movement by means of rollers such as indicated at 73 in FIGS. 2 and 4 on the elevator which are in rolling contact with the upper portions 47 of the posts 43.

Figure 6:
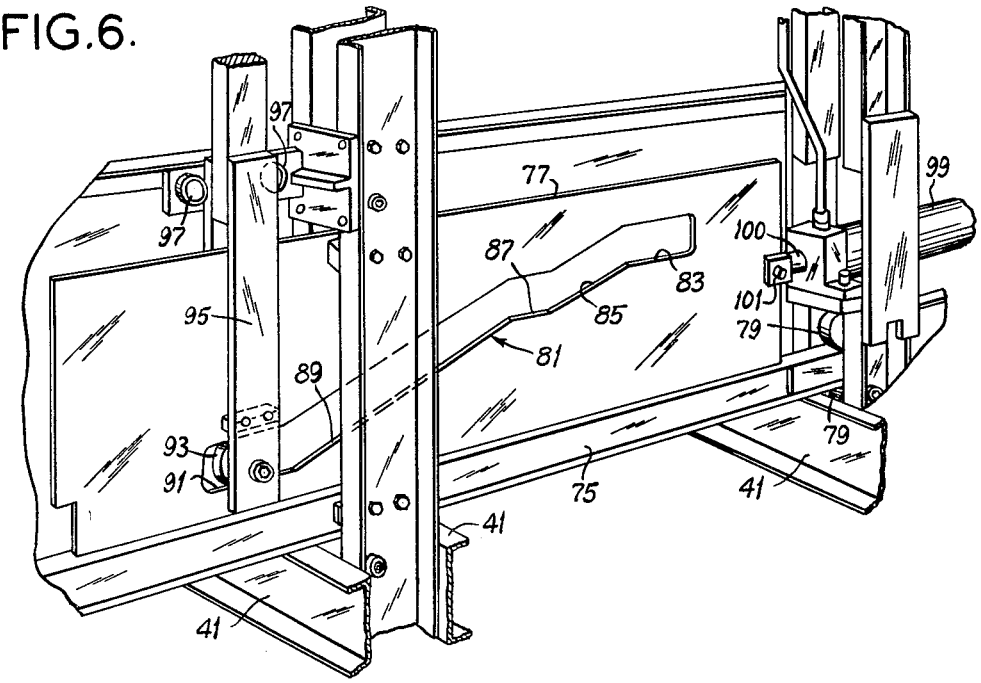
FIG. 6 is an enlarged fragmentary detailed perspective.

The means 21 (FIG. 2) for raising and lowering the elevator is shown to comprise an elongate bar 75 mounted for reciprocation longitudinally of the apparatus and carrying a number of cam plates 77 spaced at intervals along its length. This bar is accommodated in the space between channels 45 of the lower portions of posts 43 just above the base of frame 37, and is mounted for reciprocation by means of upper and lower rollers 79. Each cam plate 77 has a cam slot 81 therein having an upper horizontal end portion 83, a short inclined ramp portion 85 extending from portion 83 to an intermediate horizontal dwell portion 87, and a longer inclined ramp portion 89 extending from dwell portion 87 to a lower horizontal end portion 91. Riding in the cam slots are follower rolls 93 at the lower end of vertical struts 95 which are secured at their upper ends to the elevator. Guide rollers for struts 95 are indicated at 97. A hydraulic cylinder 99 is mounted on the base of frame 37. A piston rod 100 extends from a piston (not shown) in cylinder 99 to a connection at 101 with one of the cam plates. When piston rod 100 is fully extended (see FIG. 1), bar 75 and cam plates 77 occupy a position wherein follower rolls 93 are in the upper horizontal end portions 83 of the cam slots, and the elevator 19 is accordingly raised. On partial retraction of the piston rod 100, bar 75 and cam plates 77 move to the left as viewed in FIG. 1, rolls 93 ride down the ramp portions 85 of the cam slots to the dwell portions 87 of the cam slots, and the elevator is partially lowered, and allowed to dwell in this partially lowered position for a dwell interval. Then, on completion of retraction of the piston rod 100, rolls 93 ride down the ramp portions 89 to the lower horizontal end portions 91 of the cam slots (see FIG. 6), completing the lowering of the elevator. As will be apparent, on extension of the piston rod, bar 75 and cam plates 77 are moved to the right back to their FIG. 1 position, and the elevator is raised.

The means 27 for moving the slide bars 23 and 25 longitudinally relative to the elevator comprises a pair of hydraulic cylinders 103 and 105 mounted side-by-side between the elevator side plates 63 and 65 extending longitudinally of the elevator. A piston rod 107 extends from a piston 109 in cylinder 103 to a connection at 111 with a flange 113 extending from bar 23 over the top of plate 63. A piston rod 115 extends from a piston 117 in cylinder 105 to a connection at 119 with a flange 121 extending from bar 25 over the top of plate 65. Both cylinders have their head ends toward the left as viewed in FIGS. 1 and 3, and both piston rods 107 and 115 extend out of the cylinders toward the left. Hydraulic lines 123 and 125 are connected to ports at the head ends of the cylinders, and, a hydraulic line 127 interconnects ports at the right ends of the cylinders. The arrangement is such that on supplying hydraulic fluid to the left end of cylinder 105 via line 125 and venting the left end of cylinder 103 via line 123, piston rod 115 is retracted and piston rod 107 is simultaneously extended, thereby moving bar 23 toward the left and bar 25 to the right. Then, by supplying hydraulic fluid to the left end of cylinder 103 via line 123 and venting the left end of cylinder 105 via line 125, piston rod 107 is retracted and piston rod 115 is simultaneously extended, thereby moving bar 23 back toward the right and moving bar 25 back toward the left. The stroke of the cylinders and hence the stroke of bars 23 and 25 correspond to the carriage spacing.

Figure 4:
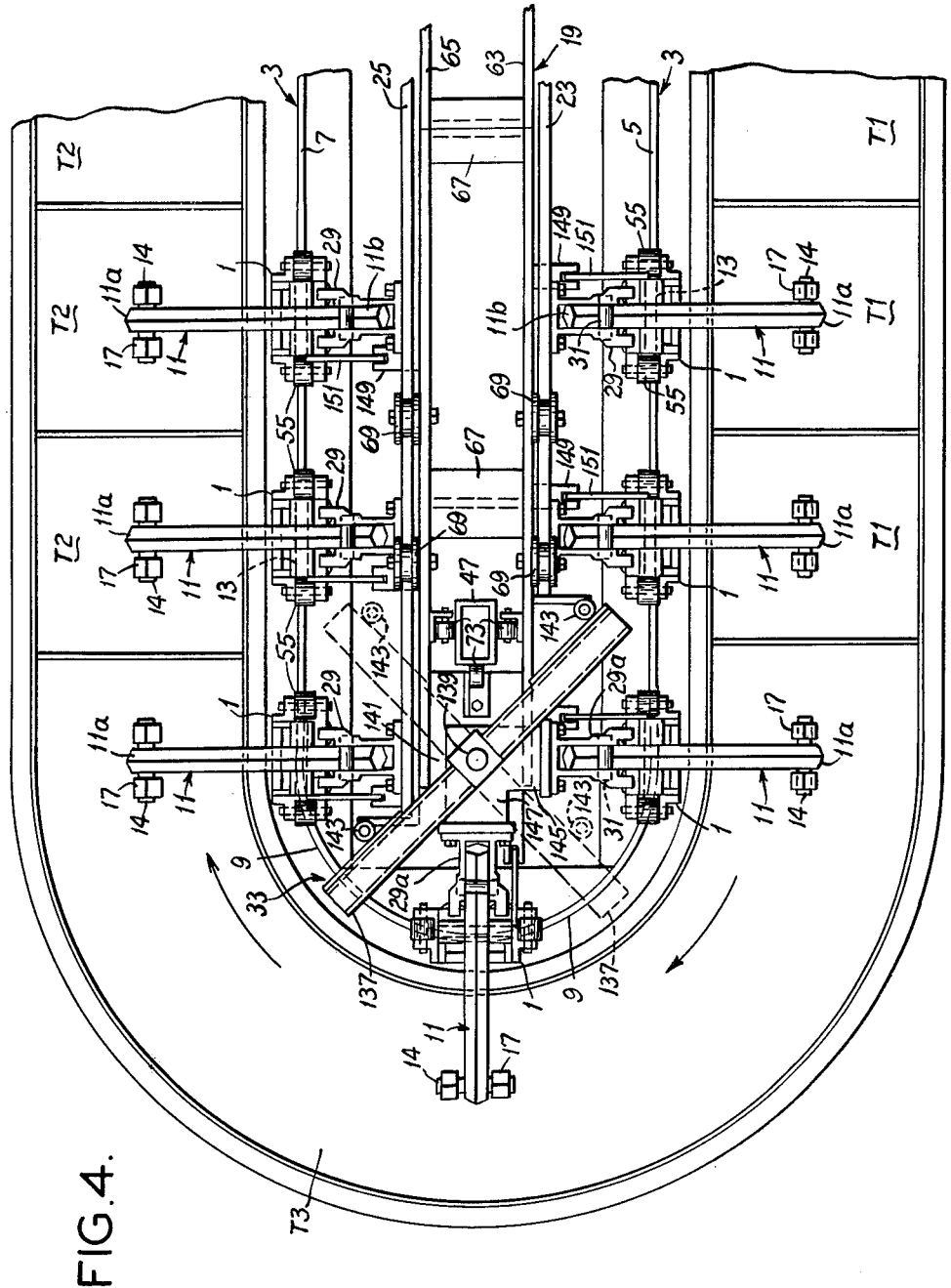
FIG. 4 is an enlarged plan of an end portion of the apparatus of FIG. 1 viewed generally on line 4—4 of FIG. 1.

Each means 33 and 35 for moving the carriages around the semicircular end rail sections comprises a lever 137 fixed at its center on the upper end of a vertical shaft 139 journalled in horizontal plates 141 at the respective end of the elevator 19. Slide bars 23 and 25 carry rollers 143 at their ends engageable with the lever for oscillating the lever through an angle of 90° on operation of the slide bars. Thus, as shown in FIG. 4 for the left end of the apparatus, when bar 23 moves to the left and bar 25 moves to the right, lever 137 at the left end of the apparatus is swung clockwise from the retracted solid line position to the dotted line position shown in FIG. 4. Concomitantly, the lever 137 at the right end of the apparatus will be swung from a retracted position parallel to the FIG. 4 solid line position of lever 137 to a position parallel to the FIG. 4 dotted line position of lever 137. Then, when bars 23 and 25 are retracted, the lever 137 at the left end of the apparatus is swung back to its FIG. 4 retracted solid line position, and the lever 137 at the right end of the apparatus is concomitantly swung back to its retracted position. Each shaft 139 has radial arms 145 and 147 at right angles to one another and at 45° angles to the lever 137, these arms carrying yokes 29a like yokes 29 at their outer ends.

It is to be understood that arms 145 and 147 could be arranged at different angles to each other if desired to move lever 137 about a different angular path. Accordingly, any desired degree of movement about the ends of conveying apparatus could be obtained.

Means is provided to lock the carriages 1 against movement on the track 3 when the elevator is raised, so that the spacing of the carriages will not be inadvertently disturbed. This means comprises a series of slotted keepers 149 (FIG. 5) on the elevator side plates 63 and 65 projecting laterally outward therefrom at their lower edges. Each carriage 1 has a tongue 151 extending laterally inward and engageable in the slot in a keeper 149 when the elevator is raised to lock the carriage against movement on the track. When the elevator is lowered, keepers 149 disengage from the tongues (see the dotted line position of the elevator side plates and keepers shown in FIG. 2) to unlock the carriages for movement on the track by yokes 29 and 29A which advance the carriages.

Figure 5:
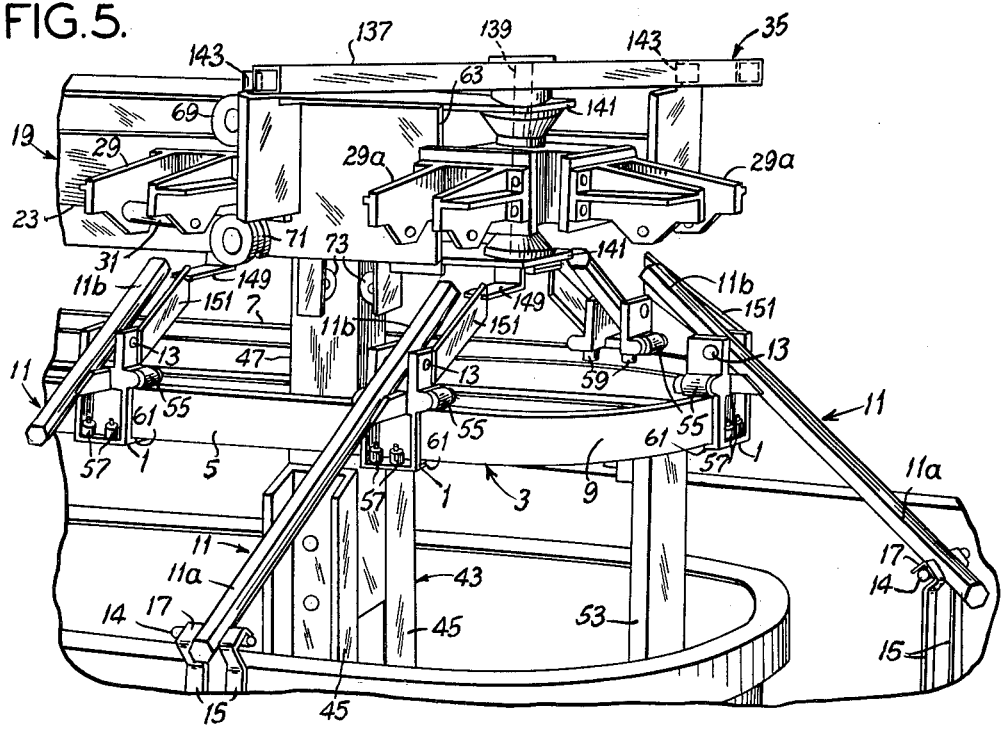
FIG. 5 is an enlarged perspective of the end portion of the apparatus showing a moved position of parts.

Operation is as follows:

As shown in FIGS. 1, 2 and 5, the elevator 19 is in its fully raised position, bar 75 and cam plates 77 thereon being at the right-hand end of their stroke as viewed in FIG. 1, followers 93 accordingly being in the upper horizontal end portions 83 of the cam slots 81. With the elevator so raised, inner end portions 11b of arms 11 are released, and outer end portions 11a of arms 11 are inclined downward so that workpieces W are down in the tanks. Carriages 1 are then locked against movement on track 3 by engagement of tongues 151 on the carriages in the slotted keepers 149 on the elevator side plates 63 and 65. Cylinder 99 is then operated partially to retract piston rod 100 to move bar 75 and cam plates 77 to the left as viewed in FIG. 1, to the point where followers 93 are in the intermediate dwell portions 87 of the cam slots 81, and bar 75 and cam plates 77 are allowed to dwell in this position for a dwell interval. As the cam plates 77 move toward the left to the dwell position, followers 93 ride down ramp portions 85 of the cam slots, and elevator 19 is partially lowered to an intermediate position wherein yokes 29 and 29a straddle the inner end portions 11b of arms 11, but with yoke pins 31 slightly above end portions 11b so that the arms 11 remain in their FIG. 2 lowered position.

During the stated dwell interval, a workpiece carrier 15 which has passed completely through the treatment is unloaded from the arm 11 on which it has been previously carried around, and another workpiece carrier 15 carrying a workpiece W is positioned for being carried through the treatment. With the yokes straddling the inner end portions 11b of the arms 11, the carriages are securely locked against displacement on track 3, so as to prevent accidental disturbance of the spacing of the carriages as may occur due, for example, to workmen knocking carriages out of their proper spaced relation. This locking of the carriages by the yokes during the unloading and loading dwell interval is more secure than that afforded by keepers 149 and tongues 151.

Upon completion of unloading and loading, operation of cylinder 99 is resumed to complete the retraction of piston rod 100, and elevator 19 is accordingly completely lowered. Pins 31 on yokes 29 and 29a then push down the inner end portions 11b of arms 11 and swing the outer end portions 11a of arms 11 upward through a lifting stroke thereby generally vertically to lift the workpieces W on work carriers 15 out of the tanks. The workpieces are lifted in vertical transverse planes, and with only a slight transverse movement, and their lift may be regarded as substantially vertical. Following the upward swinging of the outer end portions 11a of arms 11, cylinders 103 and 105 are actuated to move slide bars 23 and 25 through a forward stroke (i.e., bar 23 is moved toward the left and bar 25 is moved to the right). Since yokes 29 are straddling the inner end portions 11b of arms 11, they serve to couple the carriages 1 on the straight rail sections 5 and 7 of track 3 to the bars 23 and 25, and all the carriages on the straight rail sections are pushed forward one step to the next station (i.e., advanced a distance corresponding to the carriage spacing). Each arm 11, in raised position holding the respective workpiece W above the series of tanks, moves from a position over one tank to a position over the next tank or the next station if a single tank has more than one station. As the bars 23 and 25 move through their stated forward strokes, they act to swing levers 137 and yokes 29a around so that yokes 29a push the carriages 1 with which they have become coupled around the semicircular end rail sections 9 of the track. Thus, all the carriages are moved around the track one step from one station to the next succeeding station.

Following each one-step advance of the carriages 1 around the track 3 (with the outer end portions 11a of arms 11 raised upon engagement with pins 31), cylinder 99 is actuated fully to raise the elevator 19. This allows the raised outer end portions 11a of arms 11 to swing down for dipping the workpieces in the next successive tanks in the series. The workpieces are lowered in vertical transverse planes with only a slight transverse movement, and their descent may be regarded as substantially vertical. Raising of the elevator results in uncoupling of yokes 29 and 29a from the inner ends 11b of arms 11. Cylinders 103 and 105 are then actuated to retract the slide bars 23 and 25 i.e., to return bar 23 to the right and to return bar 25 to the left to their FIG. 4 retracted position. This retraction of bars 23 and 25 occurs without reverse movement of carriages 1, since, with the elevator 19 raised, yokes 29 and 29a are not coupled to the carriages. Retraction of bars 23 and 25 results in return of levers 137 and yokes 29 and 29a to their retracted position, and all parts are thus returned to retracted position for the start of the next cycle of operation. In the event pins 31 are omitted from some of the yokes, such as might occur along a tank having a plurality of stations, the outer end portions 11a of arms 11 will not be lifted but carriages will be advanced from the coupling of the yokes and arms.

It will be understood that tanks may be omitted at certain stations, for example at loading and unloading stations. As to the yokes 29 for such stations, the yoke pins 31 may be omitted to eliminate lifting of arms 11 at such stations while still providing for carriage advance due to coupling of the yokes to the carriages when the elevator 19 descends.

It will be observed that the couplers or yokes 29 on each slide bar constitute means movable in a vertical plane in a generally rectangular path including a generally vertical downward stroke (on descent of the elevator 19), a generally horizontal forward stroke (on advance of the slide bars), a generally vertical upward stroke (on raising of the elevator), and a generally horizontal return stroke (on retraction of the slide bars). On the downward stroke, lifter arms 11 are lifted. On the forward stroke, the carriages are advanced (pushed forward one step). On the upward stroke, arms 11 are lowered. On the return stroke of the slide bars, carriages 1 do not move, yokes 29 then being uncoupled from the carriages since the elevator is raised.

In the modification of the conveying apparatus shown in FIGS. 7, 8 and 9, a vertical lift bar 153 may be positioned at selected tanks or stations. Lift bar 153 has an end 155 adapted to engage and raise the outer end 11a of arm 11 at a selected station to the position shown in FIG. 7. A cylinder 157 has a piston rod 159 secured at one end to a slide 161 mounted for movement between guides 163. Slide 161 is connected to lift bar 153 and upon actuation of cylinder 157 when piston 159 is retracted, lift bar 153 is raised to lift the outer end 11a of arm 11. It is to be understood that cylinder 157 may be actuated to remove a workpiece from a selected tank after the workpiece has been in the tank for a predetermined time normally less than the time interval between intermittent movements of the carriages. The actuation of cylinder 157 may be controlled, for example, by individual carriers 1 actuating suitable switch means for the tank or station at which lift bar 153 is positioned.

Means designated generally 165 may be provided at selected tanks or stations to retain inner portions 11b of arms 11 in lowered position at the selected tanks or stations for a cycle of operation. Means 165 comprises a holder or angle member 167 fixed on a support 169. An arm 171 is secured to each side of support 169 and is mounted for pivotal movement about pivot 173 on a vertical post 175. Cylinder 177 has a piston 179 pivotally connected at 181 to arms 171 to swing arms 171 about pivot 173 for moving holder 167 into and out of retaining engagement with a roller 182 on the inner portion 11b of arm 11. Accordingly, actuation of cylinder 177 to project piston rod 179 swings holder 167 into a position so that inner portion 11b of arm 11 is retained by holder 167 as shown in FIG. 8 upon the raising of the elevator after advance of the carriages. Retraction of piston rod 179 swings holder 167 away from a position at which it will engage inner portion 11b, permitting outer portion 11a to lower the workpiece supported by arm 11. Cylinder 177 may be controlled by suitable switch means, such as designated generally 183, and having a switch arm 185 adapted to be actuated upon contact with a lowermost extension 187 carried by carriages 1. Extensions 187 are adjustable in and out relative to the carriages for selective engagement with switch arm 185. If desired to contact switch arm 185, the adjacent extension 187 is pushed or adjusted inwardly causing actuation of cylinder 177 and raising of holder 167. The arrangement of a plurality of extensions 187 at different heights permits switch arms at separate stations to be actuated by selected carriers. Holder 167 is retracted upon downward movement of the elevator and engagement of arm 11 by yoke pin 31 upon actuation of cylinder 177.

For holding the outer ends 11a of arms 11 lifted for a series of stations or tanks, an auxiliary guide or rail in the form of an angle is generally designated 191 and is secured to extensions 193 on rail 3. Angle rail 191 extends from holder 167 adjacent rail 3 for at least a plurality of stations or tanks and retains inner end portion 11b of arm 11 in lowered position and the workpieces in lifted position throughout the longitudinal extent of angle rail 191 without the provision of holders 167 at every station. Thus, the workpieces may be lifted or omitted from any selected tanks or stations.

In view of the above, it will be seen that the several objects of the invention are achieved and other advantageous results attained.

As various changes could be made in the above constructions without departing from the scope of the invention, it is intended that all matter contained in the above descrpition or shown in the accompanying drawings shall be interpreted as illustrative and not in a limiting sense.

What is claimed is:

1. Conveying apparatus comprising a generally horizontal fixed track, a plurality of carriages spaced at intervals along the track and adapted for simultaneous movement in one direction along the track, a lifter carried by each carriage for lifting and lowering movement relative to the carriage, means carrying a plurality of couplers engageable with and disengageable from the lifters, means mounting said coupler-carrying means for movement in a generally rectangular path including a generally vertical downward stroke, a generally horizontal forward stroke, a generally vertical upward stroke and a generally horizontal return stroke, and means for moving said coupler-carrying means in said path, said couplers being engageable with the lifters and effecting lifting thereof on one of said vertical strokes, and effecting advance of the carriages on the forward stroke, and being disengageable from and effecting lowering of the lifters on the other vertical stroke, said coupler-carrying means moving through its return stroke with the couplers disengaged from the lifters without moving the carriages.

2. Conveying apparatus as set forth in claim 1 wherein said coupler-carrying means effects lifting of the lifters via the couplers on its downward stroke and lowering of the lifters on its upward stroke.

3. Conveying apparatus as set forth in claim 2 wherein each lifter comprises an arm pivotally mounted on its respective carriage, said couplers engaging said arms for swinging them through a lifting stroke on a downward stroke of said coupler-carrying means and also becoming coupled to said arms for advancing the carriages along the track on said forward stroke of said coupler-carrying means, said couplers being uncoupled from said arms on the upward stroke of said coupler-carrying means.

4. Conveying apparatus as set forth in claim 3 further comprising means for locking the carriages against movement along the track when said couplers are uncoupled from the arms.

5. Conveying apparatus comprising a generally horizontal fixed track having straight parallel side rail sections and semicircular end rail sections, a plurality of carriages spaced at intervals along the track and adapted for simultaneous movement in one direction along and around the track, a lifter carried by each carriage for lifting and lowering movement relative to the carriage, first means adjacent one side rail section carrying a plurality of couplers engageable with and disengageable from the lifters of the carriages on said one side rail section, second means adjacent the other side rail section carrying a plurality of couplers engageable with and disengageable from the lifters of the carriages on the other side rail section, means mounting each of said first and second coupler-carrying means for movement in a vertical plane parallel to the respective side rail section in a generally rectangular path including a generally vertical downward stroke, a generally horizontal forward stroke, a generally vertical upward stroke, and a generally horizontal return stroke, with the forward and return strokes of the second coupler-carrying means opposite to the forward and return strokes of the first coupler-carrying means, means for moving said first and second coupler-carrying means in their respective paths, the couplers of the first and second coupler-carrying means being engageable with the lifters of the carriages on the respective side rail sections and effecting lifting of the lifters on one of said vertical strokes, and effecting advance of the carriages on the forward stroke, and being disengageable from and effecting lowering of the lifters on the other vertical stroke, each of said first and second coupler-carrying means moving through its return stroke with the couplers disengaged from the lifters without moving the carriages, and means for moving the carriages around the semicircular end rail sections.

6. Conveying apparatus as set forth in claim 5 wherein each lifter comprises an arm pivotally mounted on its respective carriage, said couplers engaging said arms for swinging them through a lifting stroke on a downward stroke of said first and second coupler-carrying means and also becoming coupled to said arms for advancing the carriages along the track on the forward stroke of each of said first and second coupler-carrying means, said couplers being uncoupled from said arms on the upward stroke of said first and second coupler-carrying means.

7. Conveying apparatus as set forth in claim 6 further comprising means for locking the carriages against movement along the track in response to uncoupling of said couplers from the arms.

8. Conveying apparatus comprising a generally horizontal fixed track, a plurality of carriages spaced at intervals along the track and adapted for simultaneous movement in one direction along the track, a lifter carried by each carriage for lifting and lowering movement relative to the carriage, an elevator movable up and down between first and second positions adjacent the track, slide means carried by the elevator for up and down movement therewith and generally horizontal sliding movement relative thereto, means for moving the slide means away from and back to a retracted position, and pushers carried by said slide means operable on movement of said elevator from first to second position with said slide means in retracted position to effect lifting of said lifters, and then operable on movement of said slide means away from retracted position to push the carriages along the track, said lifters being lowered on movement of the elevator to its said first position, and said slide means and pushers then being returnable to retracted position without moving the carriages.

9. Conveying apparatus as set forth in claim 5 wherein said first position of the elevator is a raised position and said second position of the elevator is a lowered position, said lifters thereby being lifted on lowering of the elevator and lowered on raising of the elevator.

10. Conveying apparatus as set forth in claim 9 wherein each lifter comprises an arm pivotally mounted on its respective carriage, said pushers being engageable with the arms to lift the arms upon downward movement of the elevator and to push the arms and associated carriages along the track upon movement of the slide means away from retracted position, the arms remaining in lifted position during their movement along the track.

11. Conveying apparatus as set forth in claim 10 wherein said elevator is slidable up and down on vertical posts, and cam means is provided for sliding the elevator up and down on the posts during intervals between movement of the slide means away from and back to its retracted position.

12. Conveying apparatus as set forth in claim 11 wherein said cam means comprises a horizontally reciprocating bar, cam plates on said bar having inclined cam slots therein, followers in said slots, and connections between said followers and said elevator, said cam slots having an intermediate dwell portion for dwell of the elevator in a partially lowered position of the elevator with the pushers coupled to the carriages but without lifting of the pivoted arms.

13. Conveying apparatus as set forth in claim 12 further comprising means for locking the carriages against movement on the track in response to raising of the elevator.

14. Conveying apparatus comprising a generally horizontal track having straight parallel side rail sections and semicircular end rail sections, a plurality of carriages spaced at intervals along the track and adapted for simultaneous movement in one direction along and around the track, an arm pivoted on each carriage for swinging movement on a horizontal axis parallel to the track, said arms extending laterally outward from the track, an elevator extending longitudinally of the apparatus between the side rail sections and movable vertically between raised and lowered positions, a pair of slide bars carried on opposite sides of the elevator for vertical movement therewith and horizontal sliding movement relative thereto, means carried by the elevator for simultaneously sliding the slide bars in opposite directions away from and back to a retracted position, a series of couplers on each slide bar, said couplers being operable on descent of the elevator to its lowered position with said slide bars in retracted position to engage inner end portions of the arms of the carriages on said side rail sections and swing the outer end portions of these arms upward and to become coupled to these carriages via engagement with the inner end portions of the arms, said bars then being slidable away from their retracted position to push these carriages forward along the side rail sections, said elevator then being movable upward to its raised position for disengagement of the couplers from the arms for lowering of the arms and said bars then being movable back to retracted position without moving any of the carriages, and means for moving the carriages around the semicircular end rail sections.

15. Conveying apparatus as set forth in claim 14 wherein the means for moving the carriages around each semicircular end rail section comprises a generally vertically extending shaft at the center of the semicircular end rail section mounted on the elevator for movement therewith, means responsive to the movement of the slide bars for oscillating the shaft upon movement of the slide bars, and couplers carried by the shaft engageable on lowering the elevator with the inner end portions of the arms on carriages at said end rail sections.

16. Conveying apparatus as set forth in claim 15 wherein the means for oscillating the shaft at each end of the apparatus comprises a lever fixed intermediate its ends on the shaft, one slide bar being engageable with one end portion of the lever to rotate the shaft in one direction and the other slide bar being engageable with the other end portion of the lever.

17. Conveying apparatus as set forth in claim 14 further comprising means at selected positions of the carriers to engage and retain the inner end portions of the arms in lowered position upon movement of the elevator to its raised position and disengagement of the pushers from the arms.

18. Conveying apparatus as set forth in claim 17 further comprising a fixed guide positioned generally horizontally in parallel relation to the track and extending between a plurality of successive positions of the carriers, said guide being arranged adjacent said means to engage the inner end portions of the arms and holding the inner end portions of the arms lowered at the plurality of carrier positions.

19. Conveying apparatus as set forth in claim 17 wherein said means at selected stations retaining the inner end portions of the arms is movable between a position in retaining relation with the inner end portions of the arms and a position removed from retaining relation with the inner end portions of the arms.

20. Conveying apparatus as set forth in claim 14 further comprising means at selected stations to raise selectively the outer end portions of the arms after the outer end portions have been lowered upon upward movement of the elevator.

21. Conveying apparatus as set forth in claim 20 in which said means at selected stations comprises a vertically movable lifting member positioned beneath an adjacent respective arm, and means to raise and lower the vertical lifting member into and out of engagement with the respective adjacent arm thereby to raise and lower the arm.

22. Conveying apparatus comprising a generally horizontal fixed track, a plurality of carriages spaced at intervals along the track and adapted for simultaneous movement in one direction along the track between respective adjacent stations, an arm pivotally mounted on each carriage for lifting and lowering movement relative to the carriage, an elevator movable up and down between first and second positions adjacent the track, slide means carried by the elevator for up and down movement therewith and generally horizontal sliding movement relative thereto, means for moving the slide means away from and back to a retracted position, pushers carried by said slide means engageable with one end of the arms to lift the opposite ends of the arms upon downward movement of the elevator, the adjacent ends of the arms constituting the inner ends and the opposite ends constituting the outer ends, said slide means moving the pushers, arms and associated carriages along the track in one direction while the outer ends of the arms are lifted, and means at selected stations to engage and retain the inner ends of the arms in lowered position upon upward movement of the elevator after the arms have been moved along the track.

23. Conveying apparatus as set forth in claim 22 wherein said means to retain the inner ends of the arms in lowered position comprises a guide positioned generally horizontally in parallel relation to the track and extending between a plurality of successive stations, the guide engaging and holding the inner ends of the arms lowered during movement of the carriages along the plurality of stations.

24. Conveying apparatus as set forth in claim 22 wherein said means to retain the inner ends of the arms in lowered position comprises means movable between a position in engagement with the inner ends of the arms and a position removed from engagement with the inner ends of the arms, thereby to permit selective holding of the arms at predetermined stations.

References Cited by the Examiner
UNITED STATES PATENTS

| | | | |
|---|---|---|---|
| 2,214,262 | 9/40 | Todd | 198—19 |
| 2,972,403 | 2/61 | Barton | 198—19 |
| 2,983,360 | 3/61 | Davis | 198—19 |
| 3,013,678 | 12/61 | Clark | 214—89 |

HUGO O. SCHULZ, *Primary Examiner.*

GERALD M. FORLENZA, *Examiner.*